No. 874,644. PATENTED DEC. 24, 1907.
P. TORRANI.
SENSITIVE PLATE PACKAGE.
APPLICATION FILED NOV. 7, 1905.
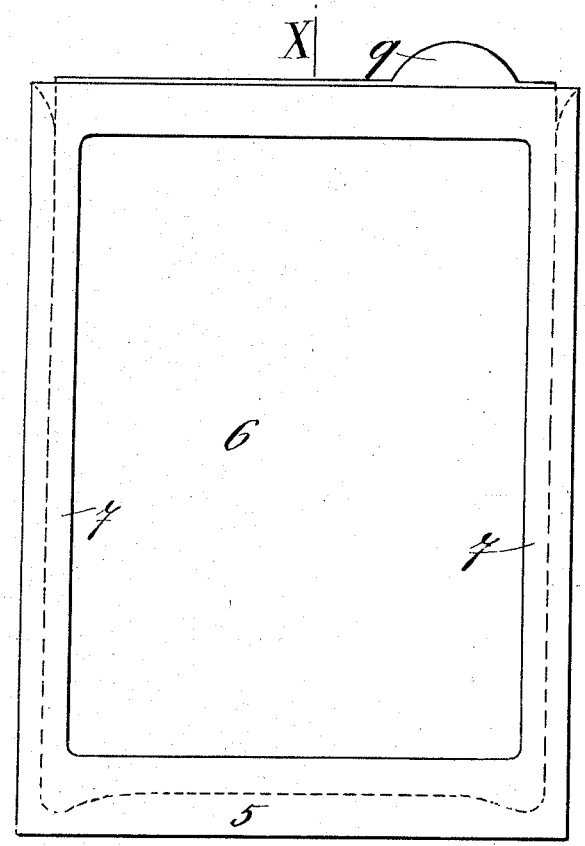
Fig. 1.
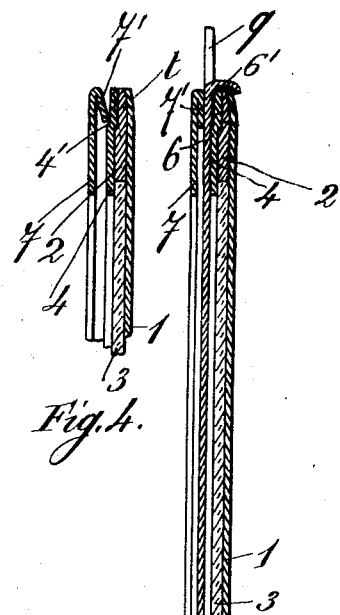
Fig. 4.
Fig. 2.
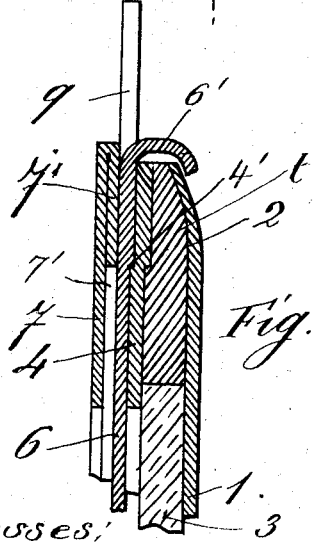
Fig. 3.
Witnesses:
Inventor
Pietro Torrani

UNITED STATES PATENT OFFICE.

PIETRO TORRANI, OF MILAN, ITALY.

SENSITIVE-PLATE PACKAGE.

No. 874,644.  Specification of Letters Patent.  Patented Dec. 24, 1907.

Application filed November 7, 1905. Serial No. 286,271.

*To all whom it may concern:*

Be it known that I, PIETRO TORRANI, merchant, subject of the King of Italy, residing at 3 Via Burigozzo, Milan, Italy, have invented certain new and useful Improvements in Sensitive-Plate Packages; and I do hereby declare the following to be a full, clear, and exact description of the invention, such as will enable others skilled in the art to which it appertains to make and use the same.

This invention relates to what I shall for convenience term a sensitive plate package. When I use the designation "plate" I do so in a broad sense to include not only a plate made of glass, but made of other materials which are sensitized for use in photographic work.

The package is an article of manufacture for it can be sold to the trade for use by consumers. Preferably it has as a part thereof a sensitive plate and this plate is so related with what might be considered the envelop that light rays cannot accidentally strike the plate. The package, however, ordinarily includes in its make-up a slide and when the package itself is placed in a camera box this slide is withdrawn to expose the plate and when the exposure is made the slide can be moved to its original position to cover the plate, after which the package can be removed from the camera box, subsequent to which the plate can be removed from the package for developing, while the envelop can be destroyed.

The invention includes certain broad relations which will succeed the following description, in which latter I will definitely describe the form of embodiment of the invention illustrated in the drawings, such description being for the purpose of enabling those skilled in the art to practice the invention.

Referring to the drawings, Figure 1 is a front view of a package including my invention. Fig. 2 is a vertical section on the line x—y, Fig. 1. Fig. 3 is a detail view of the upper portion of Fig. 2 and on an enlarged scale with the slide in place. Fig. 4 is a similar view and substantially on the same scale as Fig. 2 with the slide removed.

Like characters refer to like parts throughout the several figures.

The package in the present case consists of an envelop and a sensitive plate, the latter term as will be understood from what I have previously stated being employed in a broad sense. I prefer to make the envelop of paper. The paper may be thin or thick. In some cases the paper will be as heavy as pasteboard or strawboard. From this it will be obvious that I use the term paper in a general way to include not only the substance thus familiarly known but other material suitable for making an envelop involving my invention.

The envelop is generally made of a shape to correspond with that of the plate and that shown in the drawings includes in its construction a backing sheet as 1 which in area is the same as that of the envelop. This sheet is preferably opaque to light rays and it may be black. I attach to the inner face of the sheet 1 a frame as 2 of paper and this frame is adapted to inclose the sensitive plate 3. The frame 2 may be united to the sheet 1 in any desirable way, for example, by paste or some other adhesive. The plate 3 may be attached to sheet 1 by such an adhesive. The marginal portion of the frame 2 coincides with the marginal portion of the sheet 1. To the frame 2 I may unite by glue or its equivalent the frame 4, the marginal portion of which registers with the marginal portion of the frame 2 and sheet 1. The sides and ends of the frame 4 are deeper than the corresponding portions of the frame 2 and said frame 4, as clearly seen on inspection of Fig. 2, overlies the marginal portion of the plate 3. By the construction described, therefore, the plate is held firmly in place with the frame 4 overlying a small portion of the sensitized surface of said plate. The major portion of the sensitized face of said plate is, therefore, exposed so far as the elements previously specifically described are concerned.

In the ordinary handling of the package it is essential that the sensitized surface of the plate should be covered, and as will hereinafter appear I provide a slide for this purpose. In addition to the frame 4 there is another frame as 5. This frame 5 is shown as consisting of two sides and an end and said frame 5 is united with the frame 4 in some suitable way, as for example in the manner hereinbefore described for uniting certain other parts, that is by glue. The edges at three sides of the frame 5 register with the edges at the corresponding sides of the sheet 1, frame 2 and frame 4, the frame 5 being open at the remaining side to receive the slide. The slide 6 is guided by the sides of said frame 5 and is of some opaque material or is of such a character as to prevent light rays passing therethrough. When the slide is closed or in, its inner or lower edge abuts against the transverse portion of the frame 5, as clearly shown in Fig. 2. By removing the slide 6, the plate 3 may be exposed. There is a front frame 7, the marginal portion of which coincides with the marginal portion of sheet 1 and frames 2, 4 and 5. This front frame 7 has side and end flaps each denoted by 7' and which are folded inward. The side and lower end flaps 7' are attached by paste or otherwise to the guide frame 5, while the upper end flap 7' lies in the space between the upper ends of the sides of said frame 5. The upper end flap 7' is, therefore, not attached to anything so that when the slide 6 is withdrawn as clearly shown in Fig. 4 this upper flap 7' can of itself spring into a recess or indentation 4' in the upper transverse portion of the frame 4 so as to exclude light in the opening left by the slide 6. By virtue of the connection of the frame 7 with the frame 5 there is a bellows-like effect produced which permits the ready insertion of the slide 6 after an exposure. It will be understood that the frame 7 overlaps the marginal portion of the slide 6 when the latter is in and that it holds said slide in position at such time. Said slide 6 may be equipped with suitable means such as a tab or ear as 9 to facilitate the withdrawal thereof and which extends outward from the outer edge of said slide; said outer edge has in addition to said tab, a flap 6' which when the slide is in extends over the upper edges of the sheet 1 and frames 2 and 4 to make a light excluding closure at this place.

When the article of manufacture is put on the market it consists of an envelop and a plate, the plate being thoroughly closed in, but being accessible for exposure when in a camera box by the withdrawal of a slide. When exposure is accomplished the slide can be closed and the package can be taken from the camera box, following which the plate can be easily removed from the envelop and if desired the latter may be destroyed.

What I claim is:

1. An article of manufacture having a back sheet, a plate-inclosing frame attached to said back sheet, a second frame attached to the plate-inclosing frame, the inner portion of which extends inwardly beyond the edges of the opening in the plate-inclosing frame, a third frame attached to the second frame and having two opposite sides, and a slide adapted to move between the sides of said third frame.

2. An article of manufacture having a back sheet, a plate inclosing frame attached to said back sheet, a second frame attached to the plate inclosing frame, the inner portion of which extends beyond the edges of the opening in the plate inclosing frame, a third frame consisting of sides and an end and attached to the second frame, a slide adapted to move between the sides of said third frame, and a fourth frame attached to the third frame and overlying the marginal portion of the slide when the latter is in.

3. An article of manufacture having a back sheet, a plate inclosing frame attached to said back sheet, a second frame attached to the plate inclosing frame, the inner portion of which extends beyond the edges of the opening in the plate inclosing frame, a third frame consisting of sides and an end and attached to the second frame, a slide adapted to move between the sides of said third frame, and a fourth frame having inwardly folded marginal portions attached to the sides and end of the third frame.

4. An article of manufacture having a back sheet, a plate inclosing frame against the back sheet, a second frame against the plate inclosing frame, and the inner portion of which extends beyond the edges of the opening of the plate inclosing frame, a third frame consisting of sides and an end and lying against the second frame, a fourth frame lying against the third frame and having inwardly folded sides and end flaps, said parts being suitably attached together, and a slide adapted to move between the sides of the third frame and having a light excluding flap.

In testimony whereof I affix my signature to this specification, in the presence of two witnesses.

PIETRO TORRANI.

Witnesses:
  MICHELE DE DRAGO,
  BLARTO SALVOTEI.